United States Patent
Lucea

(10) Patent No.: US 10,442,304 B2
(45) Date of Patent: Oct. 15, 2019

(54) METHOD FOR ESTIMATING THE AUTONOMY OF AN ELECTRIC OR HYBRID VEHICLE

(71) Applicant: RENAULT s.a.s., Boulogne-Billancourt (FR)

(72) Inventor: Marc Lucea, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 155 days.

(21) Appl. No.: 15/128,252

(22) PCT Filed: Mar. 23, 2015

(86) PCT No.: PCT/FR2015/050723
§ 371 (c)(1),
(2) Date: Sep. 22, 2016

(87) PCT Pub. No.: WO2015/145053
PCT Pub. Date: Oct. 1, 2015

(65) Prior Publication Data
US 2017/0101026 A1   Apr. 13, 2017

(30) Foreign Application Priority Data

Mar. 24, 2014   (FR) ..................... 14 52456

(51) Int. Cl.
*B60L 11/18*   (2006.01)
*G01C 21/34*   (2006.01)
(Continued)

(52) U.S. Cl.
CPC .......... *B60L 11/1851* (2013.01); *B60L 58/10* (2019.02); *B60L 58/12* (2019.02); *B60L 58/26* (2019.02);
(Continued)

(58) Field of Classification Search
None
See application file for complete search history.

(56) References Cited

U.S. PATENT DOCUMENTS 9,290,108 B2 *   3/2016   Payne ................ B60L 11/1874
2008/0012535 A1 *   1/2008   Takatsuji ............. B60L 3/0046
                                                        320/150
(Continued)

FOREIGN PATENT DOCUMENTS

DE   10 2012 204 410 A1   9/2013
FR   2 991 277 A3   12/2013

OTHER PUBLICATIONS

International Search Report dated Aug. 14, 2015 in PCT/FR2015/050723 filed Mar. 23, 2015.
(Continued)

*Primary Examiner* — Thomas G Black
*Assistant Examiner* — Demetra R Smith-Stewart
(74) *Attorney, Agent, or Firm* — Oblon, McClelland, Maier & Neustadt, L.L.P.

(57) ABSTRACT

A method for estimating a range of an electric or hybrid vehicle over a predetermined trip includes estimating energy available in a traction battery of the vehicle as a function of a temperature of the battery and calculating a value representative of a trend of the temperature of the battery during the trip. The value is used to estimate the energy available.

20 Claims, 2 Drawing Sheets

Figure 1:
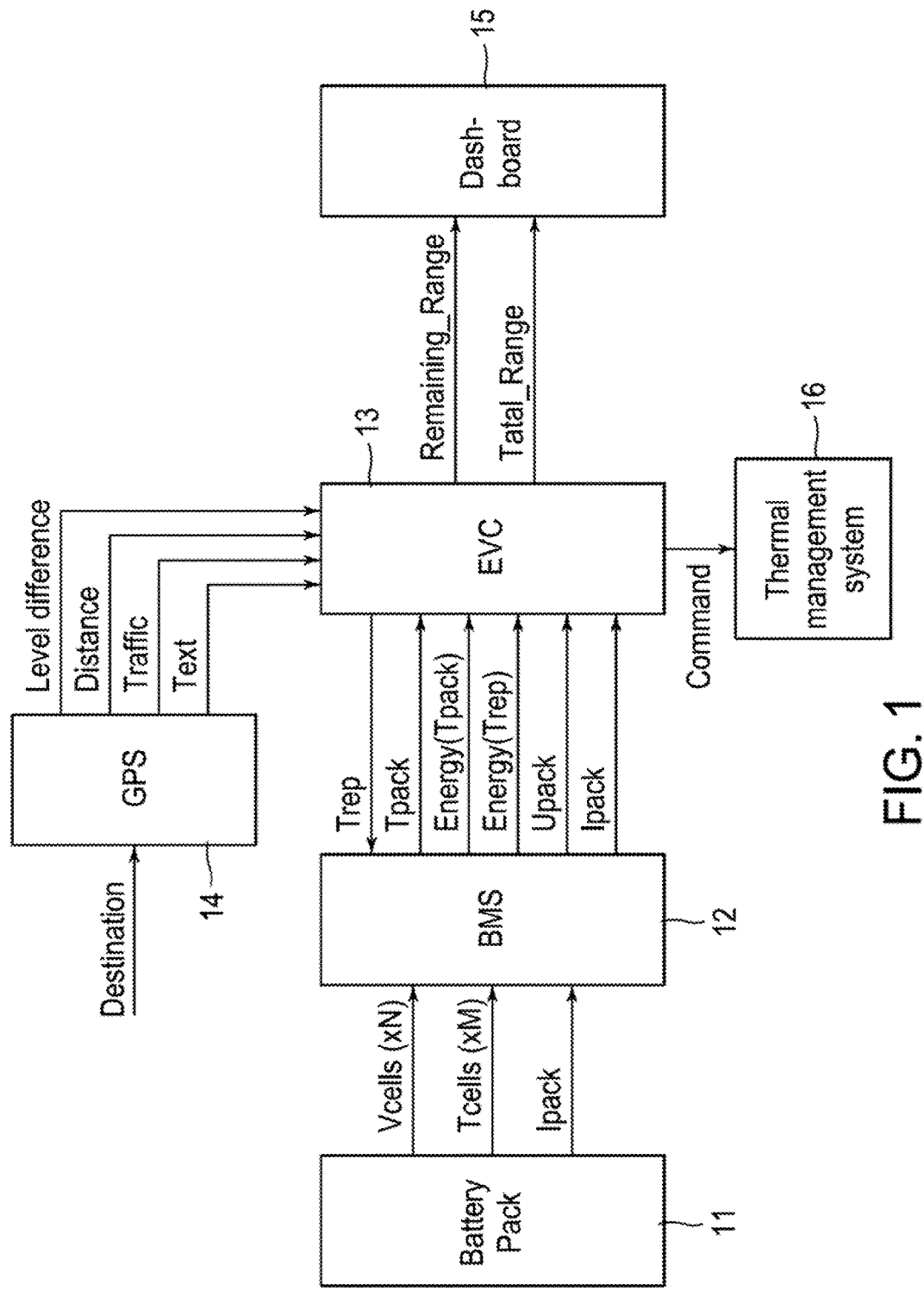

(51) Int. Cl.
    *G01C 21/36*     (2006.01)
    *B60L 58/10*     (2019.01)
    *B60L 58/12*     (2019.01)
    *B60L 58/26*     (2019.01)
    *B60L 58/27*     (2019.01)

(52) U.S. Cl.
    CPC .......... *B60L 58/27* (2019.02); *G01C 21/3469* (2013.01); *G01C 21/3691* (2013.01); *G01C 21/3697* (2013.01); *B60L 2240/26* (2013.01); *B60L 2240/36* (2013.01); *B60L 2240/545* (2013.01); *B60L 2240/547* (2013.01); *B60L 2240/549* (2013.01); *B60L 2240/622* (2013.01); *B60L 2240/642* (2013.01); *B60L 2240/645* (2013.01); *B60L 2240/662* (2013.01); *B60L 2240/68* (2013.01); *B60L 2240/80* (2013.01); *B60L 2250/16* (2013.01); *B60L 2250/18* (2013.01); *B60L 2260/52* (2013.01); *B60L 2260/54* (2013.01); *B60L 2260/56* (2013.01); *Y02T 10/705* (2013.01); *Y02T 10/7005* (2013.01); *Y02T 10/7044* (2013.01); *Y02T 10/7291* (2013.01); *Y02T 90/16* (2013.01); *Y02T 90/161* (2013.01); *Y02T 90/162* (2013.01); *Y10S 903/903* (2013.01)

(56) References Cited

U.S. PATENT DOCUMENTS

| | | | |
|---|---|---|---|
| 2008/0125264 A1* | 5/2008 | Conlon | B60K 6/365 475/5 |
| 2008/0125928 A1* | 5/2008 | Conlon | B60K 6/365 701/22 |
| 2008/0300743 A1* | 12/2008 | Conlon | B60W 20/10 701/22 |
| 2009/0005924 A1* | 1/2009 | Hasegawa | B60K 6/445 701/22 |
| 2012/0098497 A1* | 4/2012 | Ogane | B60K 6/485 320/134 |
| 2013/0204456 A1 | 8/2013 | Tippelhofer et al. | |
| 2013/0261914 A1* | 10/2013 | Ingram | B64C 39/024 701/70 |
| 2015/0100188 A1 | 4/2015 | Wagner et al. | |
| 2015/0274030 A1* | 10/2015 | Payne | B60L 11/1874 701/22 |

OTHER PUBLICATIONS

French Search Report dated Nov. 24, 2014 in FR 1452456 filed Mar. 24, 2014.

* cited by examiner

METHOD FOR ESTIMATING THE AUTONOMY OF AN ELECTRIC OR HYBRID VEHICLE

The present invention relates to a method for estimating the range of an electric or hybrid vehicle. It applies more particularly to the estimation of the range of electric vehicles equipped with a navigation system.

In the current context of consensus concerning climate change, reducing carbon dioxide ($CO_2$) emissions is a major challenge facing motor vehicle constructors, the standards being increasingly more demanding with respect thereto.

In addition to constantly improving the efficiency of conventional heat engines, which is accompanied by a lowering of $CO_2$ emissions, electric vehicles ("EV") and hybrid thermal electric vehicles ("HEV") are now considered to be the most promising solution for reducing $CO_2$ emissions.

Various electrical energy storage technologies have been tested in recent years in order to meet EV needs. It now appears that lithium-ion (Li-ion) cell batteries are those likely to provide the best trade-off between power density, which favors performance levels in terms of acceleration in particular, and energy density, which favors range. However, the use of this Li-ion technology to construct EV traction batteries does not come without numerous difficulties, particularly considering the voltage levels needed, of the order of 400 volts (V), or else considering the high temperature levels generated by the exothermal migration of the lithium ions between the electrodes of the Li-ion cells, whether in discharging when the vehicle is running or in charging when the driver connects his or her vehicle to a recharging terminal.

At the present time, the main factor slowing down the growth of electric vehicles remains their range, which is further limited by comparison to conventional heat-driven vehicles. Thus, to convince potential clients to switch to an electric vehicle, it appears essential to provide the latter with energy gauges that are as reliable as possible, in order to limit the fear of failure, while providing the driver with an estimation of the remaining kilometric range that is as realistic as possible. That is a problem that the present invention sets out to resolve.

However, the remaining kilometric range depends on a large number of parameters, among which can be cited the state of charge of the battery, the driving style of the driver, the overall weight of the vehicle, the outdoor temperature the traffic conditions or even level differences over the trip. The approach usually used consists in having a computer in charge of battery management (commonly called BMS, for "Battery Management System"), periodically estimate the energy available in the traction battery. A supervisory computer (commonly referred to by the abbreviation EVC, for "Electric Vehicle Controller") uses this estimation, based on distance, traffic and level difference information supplied by a GPS (Global Positioning System) system, to deduce a range prediction therefrom. The EVC computer therefore in a way performs a prediction of energy needed over the planned trip, and compares it to the remaining energy supplied by the BMS computer. This approach does however present a number of drawbacks in particular temperature situations. It may be a matter of a hot departure for a cold run, as when the vehicle is parked in "heated" garage and the outdoor temperature is much lower than that of the garage. The energy estimation made by the BMS computer which is based on its own temperature measurements taken by its sensors in the garage, is generally too optimistic, because the outdoor temperature to which the battery will actually be exposed during most of the trip is lower than that measured before the departure, resulting in additional losses. In an equivalent manner, when the vehicle is parked right in the sun while the ambient air temperature is lower than that measured by the BMS computer before departure, the latter will tend to overestimate the remaining energy. It may also be a matter of a cold departure for a hot run, as when the vehicle is parked in the shade or in an air-conditioned garage, while the outdoor temperature on the planned trip is much higher. In this case, the energy estimation supplied by the BMS computer is too pessimistic, because the losses caused by the low temperature are overestimated before departure. Here again this is a problem that the present invention sets out to resolve.

In order to overcome this drawback US2013/0110331A1 discloses a method for predicting the range of an electric vehicle not from one measured temperature value, but from a reading of temperature value dependent on the moment of the day. In this method, different moments of the day, notably day time or night time and the hour in the day, have associated with them temperature values recorded in the battery pack during trips made previously in a similar time band. These temperature records are used to estimate, more finely than with a single temperature value, the quantity of energy available in the battery and therefore to more finely estimate the range of the vehicle. One drawback of this method is that the range estimation does not take account of geographic peculiarities which can affect the weather conditions in general and the temperature in particular, since it implicitly assumes that, at a moment of the day, the temperature is the same everywhere. Thus, in the event of an abrupt change in weather conditions, which is probable in the case of a long trip of several hundreds of kilometers, the prediction can prove to be far removed from reality. In particular, if the driver drives from a hot zone to a colder zone, his or her rage may be overestimated and he or she may risk failure. This again is a problem that the present invention sets out to resolve.

The aim of the invention is notably to overcome the abovementioned drawbacks, in particular those linked to the changing of the weather conditions, notably temperature variations over long trips. To this end, one subject of the invention is a method for estimating the range of an electric or hybrid vehicle over a predetermined trip, the method including a step of estimating the energy available in the traction battery of the vehicle as a function of the temperature of said battery. The method according to the invention includes a step of calculation of a value representative of the trend of the temperature of the battery during the trip, said value being used to estimate the energy available.

In one embodiment, the step of calculation of the representative value can advantageously include a step of subdividing of the trip into p sections, where p is a strictly positive integer number, and a step of estimation of the temperature of the battery at the end of each of the p sections.

For example, the step of calculation of the representative value can further include the fact that the representative value is equal to the minimum value out of the p temperature values of the battery at the end of each of the p sections, or that the representative value is equal to the average value of the p temperature values of the battery at the end of each of the p sections.

Advantageously, the step of subdividing of the trip into p sections can include a step of inputting of the trip by a driver of the vehicle via the interface of a navigation system connected to the vehicle, and a step of pre-subdividing of the trip by the navigation system into q sections, where q is a strictly positive integer number less than or equal to p, such that the average speed of the vehicle estimated by the navigation system over each of the q sections varies from one section to the next over the trip.

The step of subdividing of the trip into p sections can further include, if some sections out of the q sections have an estimated travel time greater than a predetermined threshold, a second step of re-subdividing of said sections for which the travel time is too long, such that the travel time of each of the p sections thus obtained is less than or equal to the threshold.

For example, the step of estimation of the temperature of the battery at the end of each of the p sections can include, for i an integer varying from 1 to p:
- a step of estimation, as a function of the average speed (Vi) estimated over the $i^{th}$ section, of the average current (Iaverage_i) passing through the battery during the $i^{th}$ section;
- a step of estimation of the temperature (Tcooling_i), at the start of the $i^{th}$ section, of a heat transfer fluid making it possible to heat up or cool down the battery;
- a step of collection of the average outdoor temperature (Text_i) predicted over the $i^{th}$ section;
- a step of estimation of the temperature (Tpack(ti)) of the battery at the instant (ti) when the vehicle reaches the end of the $i^{th}$ section, from:
    the estimated temperature of the battery at the end of the (i−1)th section (Tpack(ti−1)) or the measured temperature (Tpack) of the battery if i=1, and/or;
    the estimated average current (Iaverage_i) passing through the battery during the ith section, and/or;
    the average outdoor temperature (Text_i) predicted over the ith section, and/or;
        the estimated temperature (Tcooling_i) of the heat transfer fluid at the start of the ith section.

For example, the step of estimation of the temperature of the battery at the end of each of the p sections can include estimating, for i an integer varying from 1 to p, the temperature (Tpack(ti)) of the battery at the end of the $i^{th}$ section by the equation:

$$Tpack(ti) = \left[Tpack(ti-1) - \frac{\gamma \cdot (\text{Iaverage\_i})^2 + \delta \cdot \text{Text\_i} + \theta \cdot \text{Tcooling\_i}}{\delta + \theta}\right] \cdot e^{-(\delta+\theta)ti} + \frac{\gamma \cdot (\text{Iaverage\_i})^2 + \delta \cdot \text{Text\_i} + \theta \cdot \text{Tcooling\_i}}{\delta + \theta}$$

in which γ, δ and θ can be parameters corresponding to thermal characteristics of the battery.

Advantageously, for i an integer varying from 1 to p, the navigation system may supply the average speed over the $i^{th}$ section as a function of the traffic conditions over said section, and the average outdoor temperature (Text_i) predicted over the $i^{th}$ section.

Another subject of the present invention is a computer comprising hardware and software means implementing such a method.

The final subject of the present invention is an electric or hybrid vehicle comprising such a computer and a dashboard on which to display the estimated range.

Figure 2:
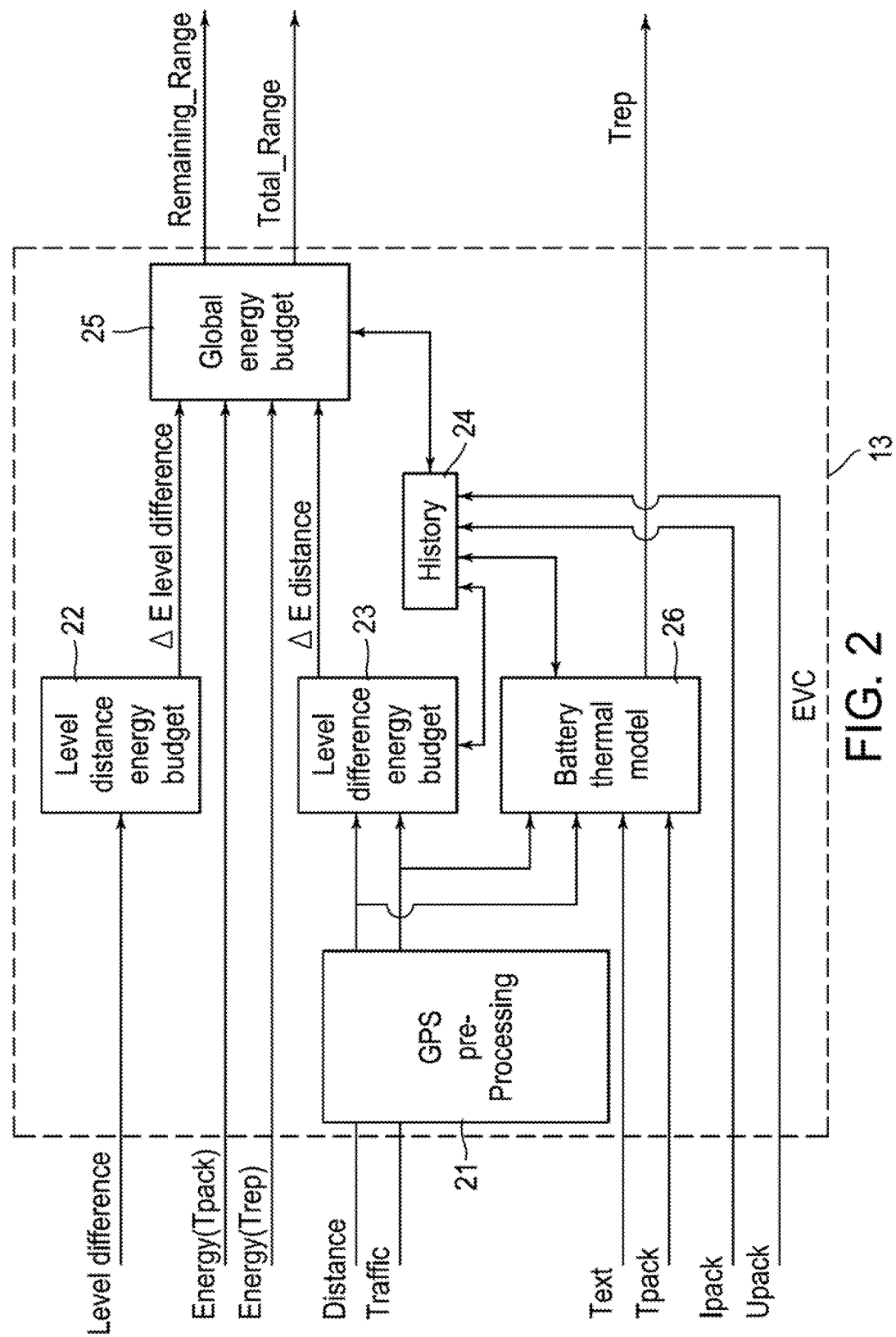

Other features and advantages of the invention will become apparent from the following description given in light of the attached FIGS. 1 and 2 and which illustrate, by an architecture diagram and a functional diagram respectively, an exemplary embodiment of the invention.

FIG. 1 therefore illustrates, by an architecture diagram, an exemplary embodiment of the invention. A battery pack 11 of an electric vehicle comprises N cells mounted in series, not illustrated in the figure. A voltage measurement is performed for each of these N cells, N having a value typically between 10 and 100 for an electric or hybrid vehicle, and the N cell voltage measurements are denoted Vcells. A set of M temperature measurements, denoted Tcells, are performed by a BMS computer 12 acting as manager of the battery pack 11, by means of sensors inserted into the battery pack 11. The current passing through the battery pack 1, denoted Ipack, is measured by a sensor not represented in the figure. As explained previously, the BMS computer 12 acts as management computer for the battery pack 11. From the input signals Vcells, Tcells and Ipack, the BMS computer 12 produces the following signals:
- Tpack: this is an estimation or a representation of the temperature of the battery pack 11 estimated from the M Tcell measurements; it can be the maximum temperature measured out of the M Tcell measurements, or even the minimum temperature, or even the average, or even a vector containing all these three minimum/maximum/average temperatures;
- Energy(Tpack): this an estimation of the energy remaining in the battery pack 11 at the temperature Tpack; estimated by conventional techniques described in the prior art, Energy(Tpack) represents the energy remaining in the battery pack 11 for a discharge at constant power, it depends on both the state of charge of the battery pack 11 at a given instant and its temperature Tpack;
- Energy(Trep): this is an estimation of the energy remaining in the battery pack 11, for a temperature value Trep representative of the trend of the temperature of the battery pack 11, Trep being calculated according to the invention described in the present application by an EVC computer 13 acting as vehicle supervisory computer;
- Upack: this is the voltage at the terminals of the battery pack 11.

In FIG. 1, a GPS system 14 acts as navigation computer. Based on the destination entered by the driver, the GPS 14 supplies the following information:
- Level difference: this the difference in altitude between the point of departure and the point of arrival on the trip entered;
- Distance: this is the distance between the point of departure and the point of arrival, for the trip entered by the driver; Distance=[D1; D2; . . . ; Dq] is used to denote the vector describing the distances of q different sections forming the trip, over which the average speed to be taken into account differs;
- Traffic: this is information on the traffic conditions; this signal may for example correspond to the average speed over the trip, which itself depends on the traffic conditions (e.g. jam, works, type of traffic lane, etc.); Traffic=[V1; V2; . . . ; Vq] is used to denote the vector describing the q different average speed values, over the q different sections D1, . . . , Dq;
- Text: this is the outdoor temperature over the trip; Text=[Text_1; Text_2; . . . ; Text_q] is used to denote the vector describing the q different average outdoor temperature values, over the q different sections of respective lengths D1, . . . , Dq.

The EVC computer 13 therefore acts as supervisory computer for the vehicle, to which the BMS computer 12, the GPS 14 and the dashboard 15 of the vehicle are connected. From the input signals Text, Traffic, Distance, Level difference, Tpack, Ipack, Energy(Tpack) and Energy(Trep), the EVC computer 13 produces the following signals:

Trep: this is a value representative of the trend of the temperature of the battery pack 11 over the trip entered by the driver; the way this value is computered according to the invention is described hereinbelow;

Remaining_Range: this is the remaining kilometric range, estimated on the basis of the trip and the temperature and traffic conditions, and which corresponds to the range margin beyond the destination entered;

Total_Range: this is the total kilometric range, estimated on the basis of the temperature and traffic conditions.

A thermal management system 16 manages the cooling and the heating of the battery pack 11 by a flow of air or of heat transfer fluid, not illustrated in the figure. The thermal management system 16 is controlled by the EVC computer 13 via control signal, the EVC computer 13 knowing the average temperature at stabilized speed of the heat transfer fluid when the system 16 is activated. This average temperature at stabilized speed is denoted Tcooling. It depends on the characteristics of the fluid and on the heating/cooling strategies implemented in the EVC computer 13.

FIG. 2 illustrates, by a functional diagram, the same exemplary embodiment of the invention, in particular the detail of the operations performed in the EVC computer 13.

A GPS information pre-processing block 21 performs a digital processing of the Distance, Text and Traffic signals supplied by the GPS system 14, so as to adapt the subdividing into sections performed by the GPS system 14 to the internal needs of the EVC computer 13. The re-subdividing performed in this block 21, from q sections produced by the GPS system 14 (where q is a strictly positive integer), makes it possible to produce p new sections (with p an integer such that p≥q), the characteristics of which, notably their times, are adapted to the thermal modeling needs. Thus at the output of the preprocessing block 21, the following vectors are obtained Distance=[D1; D2; . . . ; Dp]: this is a vector describing the distances of the p successive sections forming the trip;

Traffic=[V1; V2; . . . ; Vp]: this is a vector describing the p different average speed values, over the p different sections D1 to Dp;

Text=[Text_1; Text_2; . . . ; Text_p]: this is a vector describing the p different average outdoor temperature values, over the p different sections of respective lengths D1 to Dp.

To perform this re-subdividing, the criterion relates to the time associated with each section, that is to say the time ti=Di/Vi for i between 1 and q:

these times must be less than a pre-calibrated threshold denoted section_time_threshold, which typically be of the order of 1 minute, such that the estimations performed by the thermal model of the battery 11, which is described in detail hereinbelow are fairly reliable, notably with respect to the thermal management system 16. In effect, excessively long section times do not make it possible to correctly reproduce the cooling/heating strategies through the Tcooling signal, as described hereinbelow. Thus, if the $i^{th}$ section supplied by the GPS system 14 does not bear out ti<section_time_threshold, then this $i^{th}$ section is re-subdivided into several sub-sections bearing out ti'=Di'/Vi'<section_time_threshold. The average outdoor temperature and the average speed over these sub-sections are identical to those of the initial section, only the distance is adapted.

An energy budget block 22 linked to the level difference estimates the energy needed to undergo the level difference variation corresponding to the Level difference signal supplied by the GPS system 14, denoted ΔElevel difference. If is for example possible to estimate this energy by:

ΔElevel difference=$M \times g \times$ Level difference in which M represents the total weight of the vehicle for an average load (typically with 2 passengers), where g represents the acceleration of gravity and where Level difference represents the level difference over the trip supplied by the GPS system 14.

An energy budget block 23 linked to the distance estimates, from the Distance and Traffic signals supplied by the GPS system 14, the energy needed to travel the distance corresponding to the Distance signal supplied by the GPS system 14 in the traffic conditions corresponding to the Traffic signal supplied by the GPS system 14, denoted ΔEdistance. Different methods are described in the prior art for estimating ΔEdistance. It is for example possible to estimate it by:

$$\Delta Edistance = \sum_{i=1}^{p} [(\alpha \cdot V_i + \beta \cdot V_i^2) \cdot D_i]$$

in which α and β are calibration parameters dependent on the vehicle, where Vi is the average speed supplied by the GPS system 14 for the $i^{th}$ section of distance Di. This energy budget over the distance takes account of the mechanical and aerodynamic frictions, and of the efficiencies of the electrical members and of the drive train.

A block 24 named History makes it possible to estimate the driving style of the driver, optionally to update the parameters α and β used in the block 23, and the parameters γ, δ and θ used in a thermal modeling block 26 for the battery pack 11. Depending on whether the driver practices a sporty or economical driving style, these parameters can be updated to improve the energy budgets and the target temperature estimations. The driving style can for example be described by calculating a weighted average or a mean square value of the current Ipack passing through the battery pack 11, or of the power drawn from the battery pack 11, i.e. Upack×Ipack.

A global energy budget block 25 produces the energy budget for the Vehicle as a whole, from the signals ΔElevel difference, ΔEdistance. Energy(Tpack) and Energy(Trep). A signal calculated by the block 25 is as follows:

Remaining_range=[Energy(Trep)−ΔElevel difference−ΔEdistance]/Conso_specific(Trep)

where Conso_specific, in joules per kilometer, is a calibration value which depends on both the vehicle, such as its weight and the type of its electric drive train, and the temperature Trep;

another signal calculated by the block 25 is as follows:

Total_range=Energy(Trep)/Conso_specific(Trep)

If the Remaining_range signal is positive, an indication is displayed on the dashboard 15 to inform the driver of the remaining range estimated at the end of his or her trip. The total range can also be displayed.

A thermal modeling block 26 for the battery pack 11 estimates, from the Text, Tpack, Tcooling, Distance, Traffic signals and from the parameters possibly updated in the History block (α, β, γ, δ, θ), the target temperature Trep at which the battery pack 11 will operate during the trip. To perform this estimation, a thermal model of the battery pack 11 is used: Trep=f(Text, Tpack, Tcooling, Distance, Traffic, History).

First of all, the average current passing through the battery pack 11 during the trip is estimated: from the preprocessed signal: Traffic=[V1; V2; . . . ; Vp], average current values are determined over each of the p sections, the vector [Iaverage$_{\_1}$; Iaverage$_{\_2}$; . . . ; Iaverage_p] is obtained. These average current values are determined by means of a table of pre-calibrated values dependent on the average speed. This table takes account of the characteristics of the vehicle, like its weight or the efficiency of its electrical machine or even the gear ratio of its kinematic chain.

Next, the temperatures of the battery pack 11 at the end of the p sections forming the trip are estimated: for example, the trend of the temperature of the battery pack 11 can be expressed, in continuous time, by the following differential equation:

$$\frac{dTpack(t)}{dt} = \gamma \cdot I(t)^2 + \delta \cdot (\text{Text}(t) - Tpack(t)) + \theta \cdot (Tcooling(t) - Tpack(t))$$

in which Tpack(t) represents the temperature of the battery pack 11 at an instant t, in which Text(t) represents the outdoor temperature at the instant t, in which Tcooling(t) represents the temperature of the cooling system at the instant t and in which γ, δ and θ are setting parameters making it possible to take account of the thermal characteristics of the battery pack 11, these parameters potentially being able to be updated in the History block 24.

In the second leg of the latter differential equation above, the first term represents the internal heating of the battery pack 11, by Joules effect, the second term represents the heat flux between the battery pack 11 and the atmosphere, the third term represents the heat flux between the battery pack 11 and the cooling/heating heat transfer fluid.

To solve this differential equation in the EVC computer 13, the first step is to determine the times associated with each of the p sections, from the preprocessed Traffic and Distance information initially supplied by the GPS system 14: a vector Time=[t1, t2, . . . , tp] describes the p times associated with each of the p sections, with ti=Di/Vi for i an integer lying between 1 and p.

The following algorithm can then be executed in the EVC computer 13 according to the following steps:

Step 1: estimation of the trend of the temperature of the battery pack 11 over the 1st section of length D1, at the average speed V1 and at the average outdoor temperature Text_1

Determination of the temperature Tcooling of the heat transfer fluid: this temperature to be taken into account over the 1st section is determined by means of a table of pre-calibrated values, which describes the temperature at stabilized speed of this heat transfer fluid as a function of the temperature of the battery pack 11:

$T\text{cooling}\_1 = \text{table\_cooling}(T\text{pack})$ in which Tpack is the temperature measured in the battery pack 11 at the moment when the driver enters his or her destination into the GPS system 14, in which Tcooling$_{\_1}$ represents the average temperature of the heat transfer fluid to be taken into account over the 1st section, and in which table_cooling represents the table of pre-calibrated values. Depending on the case, this temperature Tcooling_1 may correspond to the activation of fluid heating or cooling means.

Calculation of the trend of the temperature of the battery pack 11 over the first section: from the above differential equation, and by considering as constant, over all of the 1st section, the signals Text(t)=Text_1, Ipack(t)=Iaverage_1, Tcooling(t)=Tcooling_1, there is obtained, for the estimated temperature of the battery pack 11 at the instant t1, that is to say at the end of the 1st section:

$$Tpack(t1) = \left[Tpack - \frac{\gamma \cdot (\text{Iaverage\_1})^2 + \delta \cdot \text{Text\_1} + \theta \cdot \text{Tcooling\_1}}{\delta + \theta}\right] \cdot e^{-(\delta+\theta)t1} + \frac{\gamma \cdot (\text{Iaverage\_1})^2 + \delta \cdot \text{Text\_1} + \theta \cdot \text{Tcooling\_1}}{\delta + \theta}$$

Step 2: estimation of the trend of the temperature of the battery pack 11 over the $2^{nd}$ section of length D2, at the average speed V2 and that the average outdoor temperature Text_2

Determination of the temperature Tcooling_2 of the heat transfer fluid: this temperature to be taken into account over the $2^{nd}$ section is determined by means of a table of pre-calibrated values, which describes the temperature at stabilized speed of this fluid as a function of the temperature of the battery pack 11:

$T\text{cooling\_2} = \text{table\_cooling}(T\text{pack}(t1))$ in which Tpack(t1) is the temperature of the battery pack 11 at the end of the $1^{st}$ section estimated according to step 1 above, in which Tcooling_2 represents the average temperature of the heat transfer fluid to be taken into account over the $2^{nd}$ section and in which table_cooling represents the table of pre-calibrated values. Depending on the case, this temperature Tcooling_2 may correspond to the activation of fluid heating or cooling means.

Calculation of the trend of the temperature of the battery pack 11 over the $2^{nd}$ section: from the above differential equation, and by considering as constant, over all of the $2^{nd}$ section, the signals Text(t)=Text_2, Ipack(t)=Iaverage_2, Tcooling(t)=Tcooling_2, there is obtained:

$$Tpack(t2) = \left[Tpack - \frac{\gamma \cdot (\text{Iaverage\_2})^2 + \delta \cdot \text{Text\_2} + \theta \cdot \text{Tcooling\_2}}{\delta + \theta}\right] \cdot e^{-(\delta+\theta)t2} + \frac{\gamma \cdot (\text{Iaverage\_2})^2 + \delta \cdot \text{Text\_2} + \theta \cdot \text{Tcooling\_2}}{\delta + \theta}$$

Step i in which i≤p: estimation of the trend of the temperature of the battery pack 11 over the $i^{th}$ section of length Di, at the average speed Vi and at the average outdoor temperature Text_i Determination of the temperature Tcooling_i of the heat transfer fluid over the $i^{th}$ section: this temperature to be taken into account over the $i^{th}$ section is determined by means of a table of pre-calibrated values, which describes the temperature at stabilized speed of this fluid as a function of the temperature of the battery pack 11:

$$Tcooling\_i = table\_cooling(Tpack(ti-1))$$

in which Tpack(ti−1) is the temperature of the battery pack 11 at the end of the (i−1)$^{th}$ section estimated according to step i−1, in which Tcooling_i represents the average temperature of the heat transfer fluid to be taken into account over the i$^{th}$ section, and in which table_cooling represents the table of pre-calibrated values. Depending on the case, this temperature Tcooling_i may correspond to the activation of fluid heating or cooling means.

Calculation of the trend of the temperature of the battery pack 11 over the i$^{th}$ section: from the above differential equation, and by considering as constant, over all of the i$^{th}$ section, the signals Text(t)=Text_i, Ipack(t)=Iaverage_i, Tcooling(t)=Tcooling_i, there is obtained:

$$Tpack(ti) = \left[Tpack(ti-1) - \frac{\gamma \cdot (Iaverage\_i)^2 + \delta \cdot Text\_i + \theta \cdot Tcooling\_i}{\delta + \theta}\right] \cdot e^{-(\delta+\theta)ti} + \frac{\gamma \cdot (Iaverage\_i)^2 + \delta \cdot Text\_i + \theta \cdot Tcooling\_i}{\delta + \theta}$$

By continuing the above steps until the step p, there is thus obtained an estimation of the temperature of the battery pack 11 at the end of each of the p sections which make up the trip:

$$Tpack\_est = [Tpack(t1), Tpack(t2), \ldots, Tpack(tp)]$$

Finally, the temperature Trep is determined from the vector Tpack_est obtained previously. A number of approaches are possible for determining this temperature Trep that the EVC computer 13 will return to the BMS computer 12.

According to a first approach that could be qualified as "conservative", the temperature Trep can be chosen as being the lowest temperature estimated over the trip:

$$Trep = \min_{1 \leq i \leq p}(Tpack(ti))$$

This approach can lead to a slight underestimation of the range, the losses in the battery pack 11 being more significant at low temperature. This approach is recommended when the differences between the p different values of the vector Tpack_est are relatively small.

According to another approach that could be qualified as "moderate", the temperature Trep can be chosen as being the average temperature over the p sections of the trip:

$$Trep = \text{mean}_{1 \leq i \leq p}(Tpack(ti))$$

This approach is recommended when the differences between the p different values of the vector Tpack_est are relatively great.

The above embodiment thus makes it possible to obtain a value representative of the trend of the temperature of the battery pack 11 over the trip entered by the driver via the GPS system 14, and an estimation of the range of the vehicle for this temperature value. This range estimation presents the advantage of being more reliable than that which can be made when starting the vehicle, without taking account of the temperature variations that the battery pack will undergo during the trip.

The invention claimed is:

1. A method for estimating a range of an electric or hybrid vehicle equipped with a navigation system over a trip, the method comprising:
   receiving prior to beginning the trip, using circuitry and based on operation of the navigation system, data corresponding to the trip input by a user of the vehicle;
   estimating prior to beginning the trip, using the circuitry, energy available in a traction battery of the vehicle as a function of a temperature of said battery for the trip;
   calculating prior to beginning the trip, using the circuitry, a value representative of a trend of the temperature of the battery during the trip, said value being used to estimate the energy available;
   estimating prior to beginning the trip, using the circuitry, the range of the vehicle based on the estimated energy available; and
   controlling output of the estimated range of the vehicle, using the circuitry, to a dashboard of the vehicle prior to beginning the trip,
   wherein the calculating the representative value includes:
   subdividing the trip into p sections, where p is a strictly positive integer number; and
   estimating the temperature of the battery at an end of each of the p sections.

2. The method as claimed in claim 1, wherein the calculating the representative value further includes:
   the representative value being equal to a minimum value out of the p temperature values of the battery at the end of each of the p sections, or
   the representative value being equal to an average value of the p temperature values of the battery at the end of each of the p sections.

3. The method as claimed in claim 1, wherein the subdividing of the trip into p sections includes:
   inputting a destination of the trip by the user of the vehicle via an interface of the navigation system, which is connected to the vehicle; and
   pre-subdividing of the trip by the navigation system into q sections, where q is a strictly positive integer number less than or equal to p, such that an average speed of the vehicle estimated by the navigation system over each of the q sections varies from one section to the next over the trip.

4. The method as claimed in claim 3, wherein the subdividing of the trip into p sections further includes, when some sections out of the q sections have an estimated travel time greater than a predetermined threshold, re-subdividing of said sections for which the estimated travel time is greater than the predetermined threshold, such that the travel time of each of the p sections thus obtained is less than or equal to the threshold.

5. The method as claimed in claim 3, wherein, for i an integer varying from 1 to p, the navigation system supplies:
   the average speed over the i$^{th}$ section as a function of traffic conditions over said section; and
   an average outdoor temperature predicted over the i$^{th}$ section.

6. The method as claimed in claim 1, wherein the estimating the temperature of the battery at the end of each of the p sections includes, for i an integer varying from 1 to p:
   estimating, as a function of an average speed estimated over the i$^{th}$ section, of an average current passing through the battery during the i$^{th}$ section;
   estimating a temperature, at the start of the i$^{th}$ section, of a heat transfer fluid making it possible to heat up or cool down the battery;

collecting an average outdoor temperature predicted over the $i^{th}$ section;

estimating the temperature of the battery at an instant when the vehicle reaches the end of the $i^{th}$ section, from:
the estimated temperature of the battery at the end of the $(i-1)^{th}$ section or the measured temperature of the battery if i=1, and/or;
the estimated average current passing through the battery during the $i^{th}$ section, and/or;
the average outdoor temperature predicted over the $i^{th}$ section, and/or;
the estimated temperature of the heat transfer fluid at the start of the $i^{th}$ section.

7. The method as claimed in claim 6, wherein the estimating the temperature of the battery at the end of each of the p sections includes estimating, for i an integer varying from 1 to p, the temperature of the battery at the end of the $i^{th}$ section by the equation:

$$Tpack(ti) = \left[Tpack(ti-1) - \frac{\gamma \cdot (\text{Iaverage\_i})^2 + \delta \cdot \text{Text\_i} + \theta \cdot \text{Tcooling\_i}}{\delta + \theta}\right] \cdot$$
$$e^{-(\delta+\theta)\cdot ti} + \frac{\gamma \cdot (\text{Iaverage\_i})^2 + \delta \cdot \text{Text\_i} + \theta \cdot \text{Tcooling\_i}}{\delta + \theta}$$

in which $\gamma$, $\delta$ and $\theta$ are parameters corresponding to thermal characteristics of the battery,
Tpack(ti−1) is the estimated temperature of the battery at the end of the $(i-1)^{th}$ section,
Iaverage_i is the average current passing through the battery during the $i^{th}$ section,
Text_i is the average outdoor temperature predicted over the $i^{th}$ section, and
Tcooling_i is the temperature, at the start of the $i^{th}$ section, of the heat transfer fluid.

8. The method as claimed in claim 1, wherein the range corresponds to a range margin beyond a destination associated with the trip.

9. The method as claimed in claim 1, wherein the range corresponds to a total range of the vehicle prior to beginning the trip and/or a total range of the vehicle during the trip.

10. The method as claimed in claim 1, wherein said calculating the value representative of the trend of the temperature of the battery during the trip is based on a function of temperature of a cooling system over time for the trip.

11. A computer, comprising hardware and software means configured to implement the method as claimed in claim 1.

12. An electric or hybrid vehicle, comprising:
the computer as claimed in claim 11; and
the dashboard on which to display the estimated range.

13. A method for estimating a range of an electric or hybrid vehicle equipped with a navigation system over a trip, the method comprising:
receiving prior to beginning the trip, using circuitry and based on operation of the navigation system, data corresponding to the trip input by a user of the vehicle;
estimating prior to beginning the trip, using the circuitry, energy available in a traction battery of the vehicle as a function of a temperature of said battery for the trip;
calculating prior to beginning the trip, using the circuitry, a value representative of a trend of the temperature of the battery during the trip, said value being used to estimate the energy available;
estimating prior to beginning the trip, using the circuitry, the range of the vehicle based on the estimated energy available; and
controlling output of the estimated range of the vehicle, using the circuitry, to a dashboard of the vehicle prior to beginning the trip,
wherein the range corresponds to a range margin beyond a destination associated with the trip.

14. The method as claimed in claim 13, wherein said calculating the value representative of the trend of the temperature of the battery during the trip is based on a function of temperature of a cooling system over time for the trip.

15. A computer, comprising hardware and software means configured to implement the method as claimed in claim 13.

16. An electric or hybrid vehicle, comprising:
the computer as claimed in claim 15; and
the dashboard on which to display the estimated range.

17. A method for estimating a range of an electric or hybrid vehicle equipped with a navigation system over a trip, the method comprising:
receiving prior to beginning the trip, using circuitry and based on operation of the navigation system, data corresponding to the trip input by a user of the vehicle;
estimating prior to beginning the trip, using the circuitry, energy available in a traction battery of the vehicle as a function of a temperature of said battery for the trip;
calculating prior to beginning the trip, using the circuitry, a value representative of a trend of the temperature of the battery during the trip, said value being used to estimate the energy available;
estimating prior to beginning the trip, using the circuitry, the range of the vehicle based on the estimated energy available; and
controlling output of the estimated range of the vehicle, using the circuitry, to a dashboard of the vehicle prior to beginning the trip,
wherein the range corresponds to a total range of the vehicle prior to beginning the trip and/or a total range of the vehicle during the trip.

18. The method as claimed in claim 17, wherein said calculating the value representative of the trend of the temperature of the battery during the trip is based on a function of temperature of a cooling system over time for the trip.

19. A computer, comprising hardware and software means configured to implement the method as claimed in claim 17.

20. An electric or hybrid vehicle, comprising:
the computer as claimed in claim 19; and
the dashboard on which to display the estimated range.

* * * * *